Patented Dec. 27, 1938

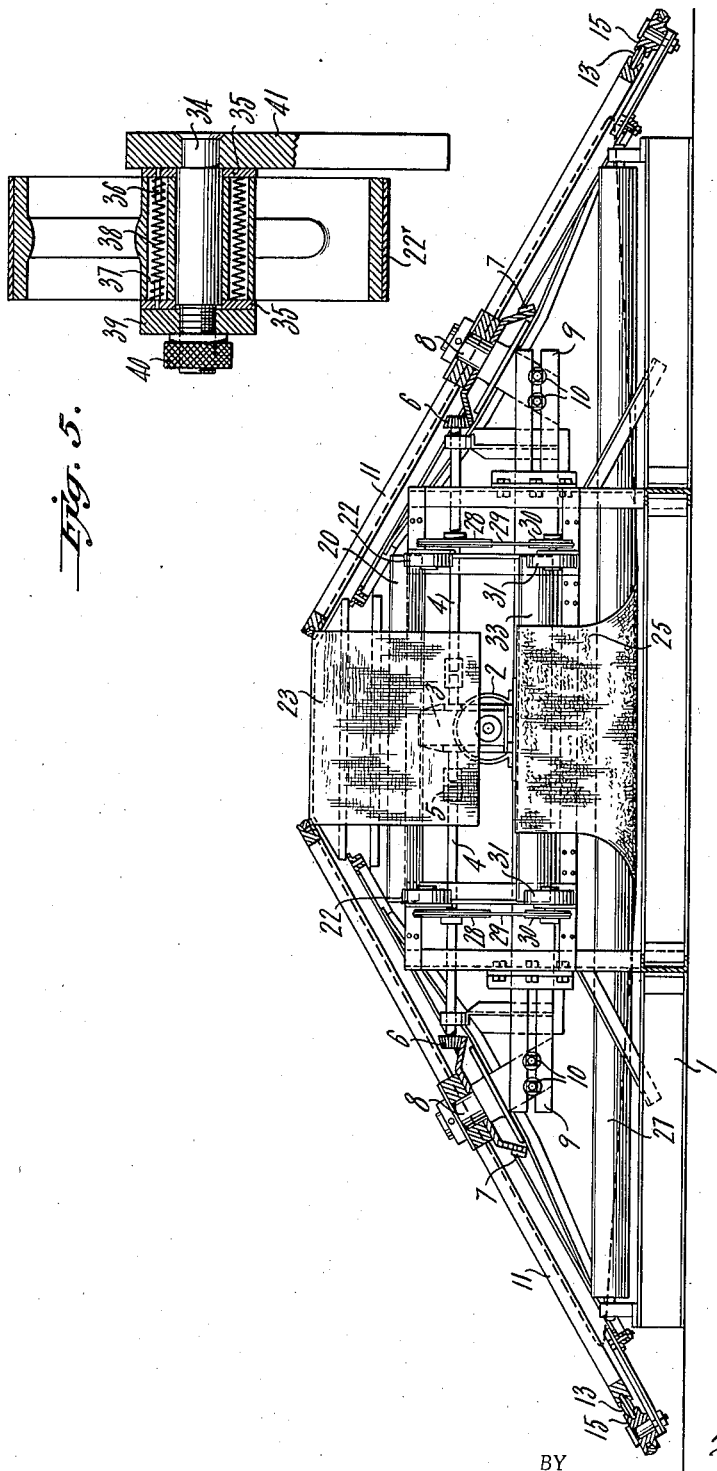

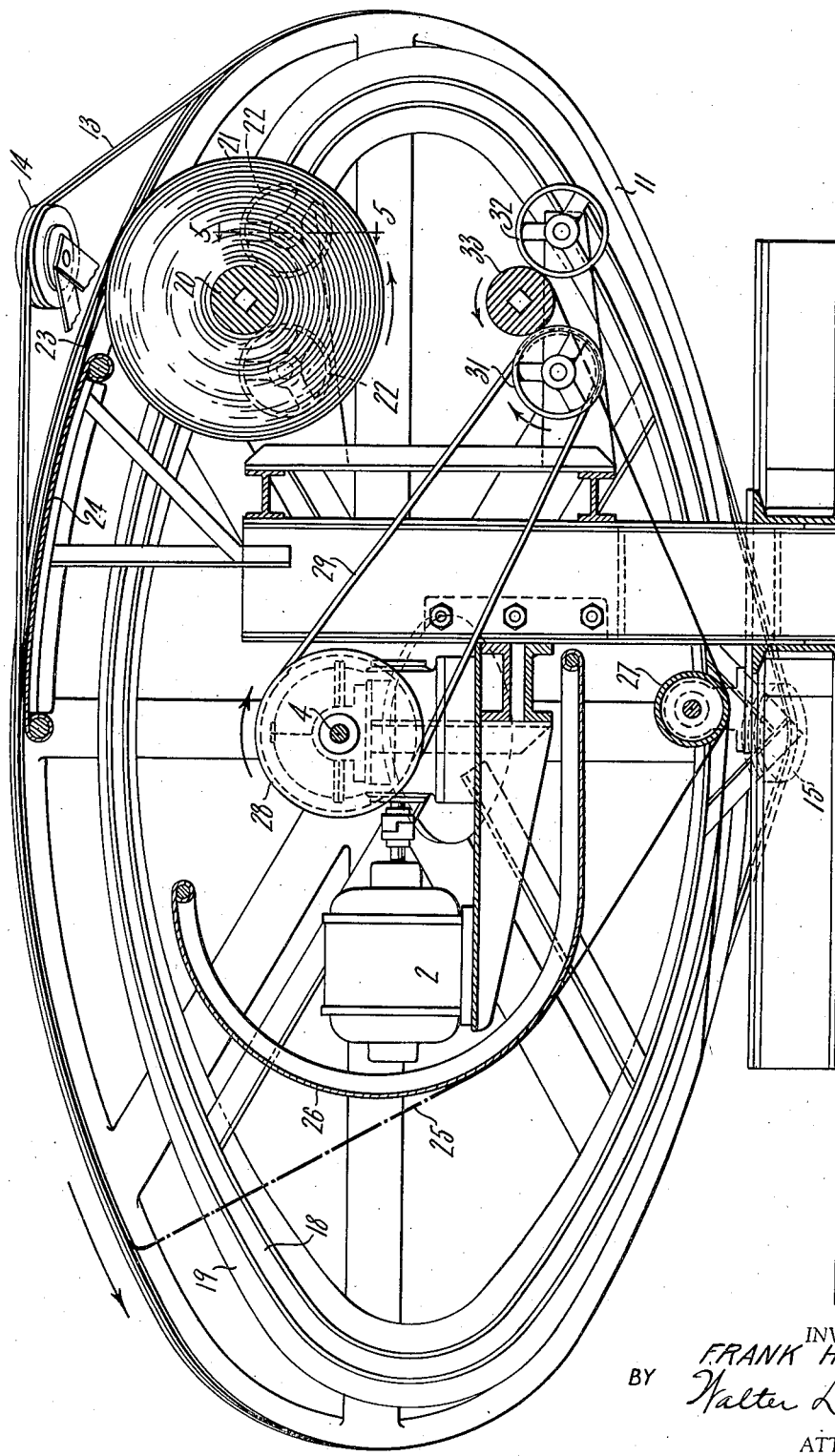

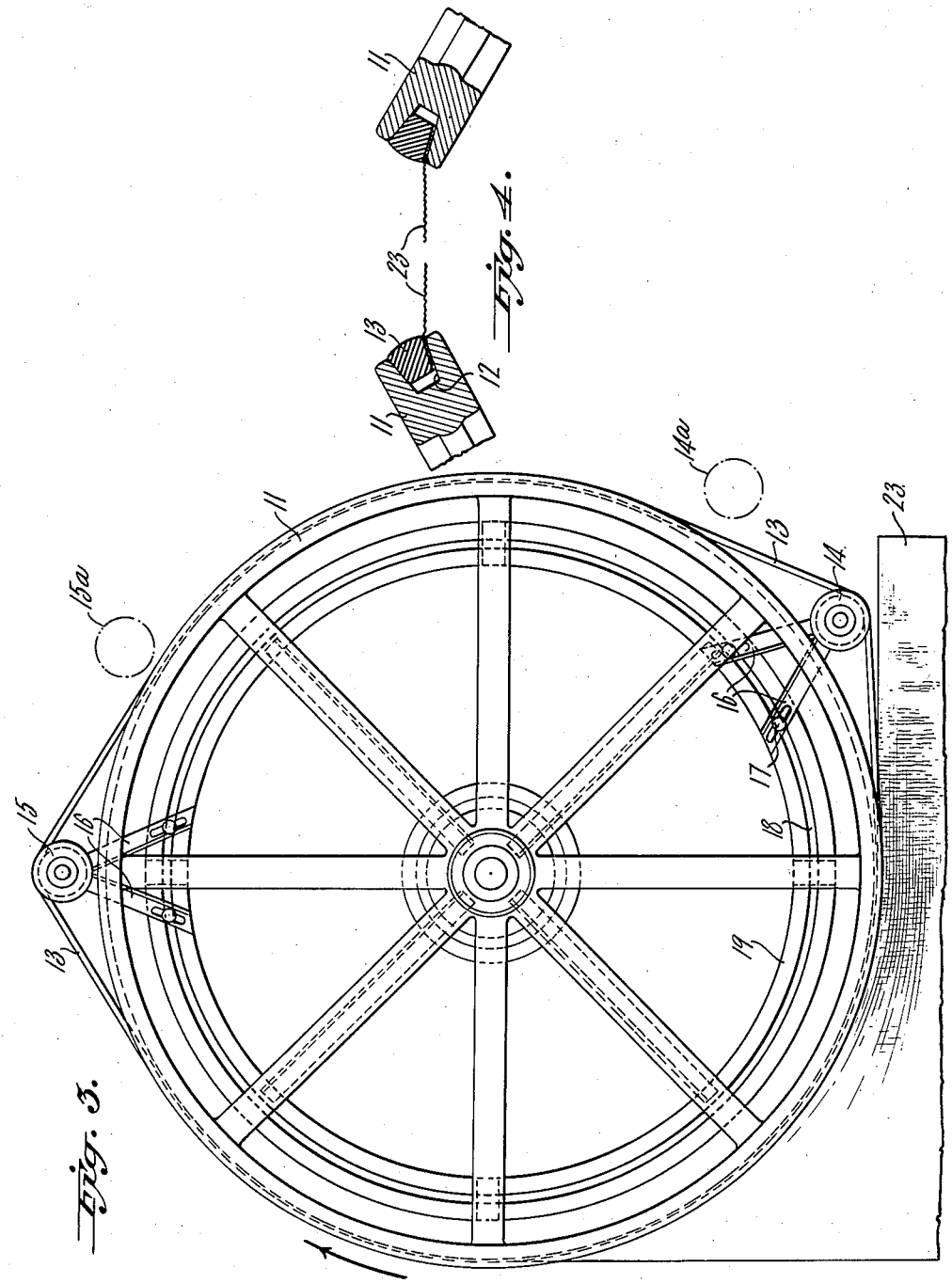

2,141,913

UNITED STATES PATENT OFFICE 2,141,913

SHEET STRETCHING APPARATUS

Frank Honig, Pawtucket, R. I., assignor, by mesne assignments, to United States Rubber Company, New York, N. Y., a corporation of New Jersey Application December 6, 1935, Serial No. 53,154

4 Claims. (Cl. 26—54)

This invention relates to a sheet stretching or tentering apparatus, and more particularly to a machine for stretching sheet rubber stock.

Stretching or tentering machines are widely used in the textile and other arts for stretching textile fabrics or other sheet materials for various purposes. The machines in general are bulky, not easily adjustable, and are incapable of stretching material to a very great extent. In particular, in the rubber art, there is need of a stretching or tentering device for widely stretching sheet rubber stock in the formation of crinkled sheet rubber.

An object of my invention is to provide an improved tentering or stretching machine.

Another object is to provide a compact machine capable of giving an extended lateral stretch.

Another object is to provide a machine which is readily adjustable for treating different widths of sheet stock and for varying the degree of stretch imparted to them.

A further object is to provide a machine for stretching sheet rubber stock in the formation of crinkled sheet rubber.

Other objects will appear from the detailed description and drawings, in which latter.

Fig. 1 is a part section and front elevation of the machine of the present invention;

Fig. 2 is a part sectional side elevation;

Fig. 3 is a broken away top plan view;

Fig. 4 is a detailed section illustrating the manner of clamping the edges of the stock, and Fig. 5 is a sectional view of a modified detail.

While the invention is capable of general use in the stretching or tentering of various sheet materials, it is particularly applicable for the lateral stretching of a previously crinkled sheet rubber stock in order to vary the character of the crinkling, as in the method of crinkling sheet rubber which is set forth in copending application of Galligan and Robinson, Serial No. 46,469, filed October 24, 1935. In this method two sheets of rubber of unequal tensile strength, such as a sheet of calendered milled rubber and a sheet of rubber deposited directly from latex, are superposed and passed between even speed pressure rolls, one or both of which rolls are provided with projections for adhesively uniting the sheets at closely spaced small areas. As the sheets are passed between the rolls the sheet of greater tensile strength is in a stretched condition, and as the united sheets pass out from the rolls the stretched sheet relaxes and, due to the adhesion of the unstretched sheet to it at closely spaced small areas, the unstretched sheet is caused to buckle up into puckers or crinkles. These crinkles in general run crosswise to the direction of stretching. In the said process the crinkled sheet is then stretched laterally to a high degree, sufficient to stretch the milled rubber sheet beyond its elastic limit, while the stretch remains within the elastic limit of the rubber deposited from latex. As a result when the composite sheet is permitted to contract again laterally, the crinkles in the milled rubber sheet, having been stretched beyond their elastic limit, are considerably extended and thinned out and can no longer contract into the same form they had before the stretching. Hence the crinkles assume a very irregular and curled form, all as described in said application of Galligan and Robinson.

Briefly, the present machine comprises two rotatable wheels provided with V-shaped grooves in their peripheries, the wheels having their axes set at an opposite inclination to each other, and the wheels being spaced from each other and approaching most closely at the highest points reached by their peripheries. V-shaped belts are arranged to run in the grooves of the wheels, but on opposite sides of each wheel the belts are temporarily withdrawn from the grooves by idler pulleys. The sheet of stock to be stretched is guided to direct its edges into the grooved peripheries of the wheels at or adjacent the nearest points reached by the peripheries, and just prior to the points at which the belts again engage the grooves after having been withdrawn by the idler rolls. As a result the belts grip the edges of the sheet in the grooves of the wheels, and as the wheels rotate the portions of their peripheries gripping the edges of the stock are moved away from each other, thus stretching the stock. After the desired amount of stretch has been imparted, the wheels approach the points at which the belts are again withdrawn from the grooves, and at these points the stretched sheet of stock is released and allowed to contract. The sheet is then guided beneath the machine under a guide roll and wound up on a wind-up reel.

Referring to Figs. 1 to 4 there is shown a main frame 1, upon which is mounted a motor 2 which by the gearing 3 drives the sectional main shaft 4 extending toward each side of the machine. In order to provide for longitudinal adjustment of the shaft, slide couplings 5 are provided. As the stretching wheel mechanism at each side of the machine is identical, but one of them will be described. The outer end of the shaft 4 is provided with a gear 6 meshing with the gear 7, which latter is rotatably mounted on the stub axle 8. The axle 8 is adjustably mounted on the slotted support 9 by means of the bolts 10. Secured to the gear 7 is a wheel 11 provided with a V-shaped groove 12 in its periphery (Fig. 4), and in the groove 12 there is adapted to engage a V-shaped belt 13. This belt may be made of any of the usual materials, such as rubber and fabric or cord. The groove is made deeper than the belt in order to provide for strong frictional gripping.

Referring more particularly to Fig. 3, it will be seen that the belt 13 is held away from its groove on opposite sides of the wheel by means of the idler pulleys 14 and 15. These pulleys are mounted on arms 16 which by means of the bolts 17 passing through slots 18 of ring 19 may be adjustably secured, the ring 19 being held by the stub shaft 8 below the wheel 11. By adjusting the pulley 14 to the right, as shown in Fig. 3, the point at which the belt 13 first engages the groove of wheel 11 may be advanced, so that when the pulley is in the position shown in dot and dash lines shown at 14a, the belt will engage the pulley considerably in advance of the point of closest proximity of the peripheries of the two wheels. As shown in full lines in Fig. 3, the idler pulley 14 is so positioned that the belt engages the groove of the wheel 11 just slightly in advance of the point of closest proximity of the two wheel peripheries. Thus by varying the position of the pulley 14, the point at which the sheet of stock to be stretched is first clamped may be varied. The pulley 15 is disposed on the opposite side of the wheel 11, and by varying its position the point at which the belt 13 leaves the wheel 11 to release the stretched stock may be varied. For example, if moved to the point indicated in dot and dash lines at 15a, the belt will then be disposed to retain the stretched stock clamped for the greatest stretching distance.

Referring more particularly to Fig. 2, there is shown at 20 the spindle of a reel of stock 21 which is to be stretched, the spindle resting on spaced pairs of idler rolls 22. As the sheet of stock 23 is withdrawn from the reel, it passes across the guide plate 24 which is arranged to present the edges of the sheet in proper position to be clamped by the belts 13 adjacent the point of closest proximity of the wheels 11. As the clamped sheet passes forwardly the rotation of the wheels 11 stretches it until the belts are withdrawn by the idler pulleys 15, when the stretched sheet 25 is released and passes downwardly beneath the guide 26, and thence under the guide roll 27. Mechanism for winding up the stretched stock is provided, this consisting of pulleys 28 mounted on the sectional main shaft 4, which pulleys through belts 29 drive pulleys 30 (Fig. 1) carrying friction faced rollers 31. Spaced from the rollers 31 are similar idler rollers 32, and the wind-up spindle 33 rests by gravity on the rollers 31 and 32 and is frictionally turned thereby to wind up the stretched stock coming to it from the guide roll 27.

In some cases it may be desirable to also longitudinally stretch the sheet stock at the same time it is being laterally stretched, and for this purpose the supporting rollers 22 may be provided with friction brakes so as to offer greater resistance to the turning action of the spindle 20 of the stock reel 21. In Fig. 5 there is shown one suitable form of friction brake, in which the friction surfaced roll 22' is mounted on a fixed axle 34 which also carries a pair of friction washers 35 which are held to rotate with the roll by means of pins 36 entering recesses 37 in the hub of the roll. Coil compression springs 38 surround the pins 36 and urge the friction washers 35 outwardly. One friction washer is engaged by the tension adjusting nut 39 screw threaded on the axle 34 and held by the lock nut 40. The other friction washer is pressed against the face of the support 41 for the axle 34.

In operation the sheet of stock is unwound from the reel 21, passes over the guide plate 24 which presents the edges of the sheet in position to enter the grooves 12 of the wheels 11 slightly in advance of the points where the belts 13 re-engage the peripheries of the wheels after leaving the idler rolls 14. As shown in Fig. 3 the adjustment of the idler rolls 14 is such as to clamp the sheet 23 along a line substantially tangential to the periphery of wheel 11 and parallel to the direction of movement of the sheet. As the wheels rotate, the points at which the sheet was first clamped in the grooves of the wheels 11 move away from each other and toward the idler pulleys 15. Shortly before the idler pulleys 15 are reached, the belts 13 are guided away from the peripheries of wheels 11, thus releasing the edges of the stretched sheet 25 and allowing it to contract and turn downwardly beneath the guide plate 26. After passing beneath the guide roll 27, the stretched sheet is then wound up on the wind-up spindle 33.

If a wider sheet is to be stretched, the wheels 11, being adjustable by means of the bolts 10 and slotted supports 9, may be moved apart to increase the distance between their points of nearest approach. The drive shafts 4 being adjustable permit this movement and the parts carried by the drive shafts and operated therefrom are also adjustable so as to move with the shaft. In this manner the machine may be adjusted to take care of various widths of stock without in any way varying the position of idler pulleys 14. However, the machine may be adjusted to take care of a wider sheet by merely advancing the idler pulleys 14 to the right as shown in Fig. 3. When thus moved to the right, the pulleys 14 will of course cause the belts 13 to engage the grooves of wheels 11 at points in advance of the least distance between the wheels 11, and hence a wider stock being clamped at these advanced points will first have its edges brought closer together until they have passed the point of least distance between the pulleys 11, which latter is on the line joining their axes. Necessarily there will be no stretching action of such a wider sheet until it has passed to a point beyond such line to a distance equal to the distance in advance of the line at which its edges were first engaged. As before stated, by varying the position of the idler pulley 15, the extent of stretching of the stock can be varied, since the further it is moved to the right as shown in Fig. 3, the longer the belt will hold the stock clamped in the groove of wheel 11.

As pointed out previously, the machine while capable of general use for stretching sheet materials, is particularly adapted for carrying out the process, set forth in the before mentioned Galligan and Robinson application, for laterally stretching a previously crinkled multiple ply sheet of rubber. When the wheels 11 are inclined at the angle shown in Fig. 1, which is approximately 120° to each other, the machine is capable of imparting a stretch of about 800%, that is, it will stretch a sheet to eight times its original width. However, by varying the positions of the idler pulleys 14 and 15, the machine may be adjusted to impart a considerably less degree of stretch.

While a specific embodiment of the invention has been shown and described, it is obvious that numerous modifications may be made therein, and it is not desired to limit the invention otherwise than as required by the prior art and as set forth in the appended claims.

Having thus described my invention, what I claim and desire to protect by Letters Patent is:

1. A sheet stretching apparatus comprising spaced wheels having their planes of rotation inclined to the horizontal upwardly toward each other at a large angle, means for rotating the wheels, said wheels having peripheral grooves, means for guiding a sheet between said wheels and its edges into said groove along an arc having a radius extending in the direction of the other wheel, an idler pulley adjacent each wheel and located on an arc near the point of entry of said edges, an idler pulley adjacent each wheel arranged along an arc having a radius extending away from the other wheel, continuous belts each passing around a wheel and its adjacent pulleys, and means whereby each idler pulley may be peripherally adjusted relative to its adjacent wheel.

2. A multiply rubber sheet stretching apparatus comprising spaced wheels having their planes of rotation inclined to the horizontal upwardly toward each other at a large angle, means for rotating the wheels, said wheels having peripheral grooves, means for rotatably mounting a sheet stock reel, braking means for controlling rotation of the reel, means for guiding the unreeled sheet between said wheels and its edges into said grooves, belts for clamping said sheet edges in said grooves for predetermined lengths of arc on said wheels, means for releasing the sheet edges, and means for winding up the stretched sheet.

3. A sheet stretching apparatus comprising spaced wheels having their planes of rotation inclined to the horizontal upwardly toward each other at a large angle, said wheels having peripheral grooves, means for rotating said wheels, means for guiding a sheet between said wheels and its edges into said grooves along an arc having a radius extending in the direction of the other wheel, belts for clamping said edges in the grooves for predetermined lengths of arc of said wheels, means at each end of said lengths of arc for displacing said belts from the grooves, a curved guide plate for guiding the released sheet downwardly and in a reverse direction, and means for reeling up the released sheet.

4. A sheet stretching apparatus comprising spaced wheels having their planes of rotation inclined to the horizontal and upwardly toward each other at a large angle, each of said wheels having a groove in its outer face, at least two idler pulleys positioned around the periphery of each wheel and spaced therefrom, said pulleys having their planes of rotation lying in the planes of rotation of said wheel, a belt completely surrounding each wheel and its associated pulleys, one of said pulleys for each wheel being positioned so that the belt begins to make contact with the groove in the wheel at a point adjacent to the shortest distance between the circumferences of the wheels, and the other pulley of each wheel being spaced from the first pulley along the circumference of the wheel and mounted on an axis which may be adjustably fixed on a circle about the axis of the wheel, so that the belt forms an arc of contact with said groove between the two pulleys, and such arc of contact may be varied to increase or diminish the degree of stretch to be imparted to a sheet whose edges may be clamped between the belts and the grooves in the wheels.

FRANK HONIG.